United States Patent
Johnson et al.

(10) Patent No.: US 12,238,366 B2
(45) Date of Patent: Feb. 25, 2025

(54) REAL-TIME OBJECTS INSERTION INTO CONTENT BASED ON FRAME IDENTIFIERS

(71) Applicant: ROKU, INC., San Jose, CA (US)

(72) Inventors: Neil Edward Johnson, Cambridge (GB); Ramesh Babu Anaparti, Leander, TX (US); Thejaswi Hanumantha Raya, Fremont, CA (US)

(73) Assignee: Roku, Inc., San Jose, CA (US)

( * ) Notice: Subject to any disclaimer, the term of this patent is extended or adjusted under 35 U.S.C. 154(b) by 57 days.

(21) Appl. No.: 18/189,518

(22) Filed: Mar. 24, 2023

(65) Prior Publication Data
US 2024/0323478 A1  Sep. 26, 2024

(51) Int. Cl.
*H04N 21/431* (2011.01)
*G06T 3/40* (2006.01)
*G06V 20/40* (2022.01)

(52) U.S. Cl.
CPC .......... *H04N 21/4316* (2013.01); *G06T 3/40* (2013.01); *G06V 20/46* (2022.01)

(58) Field of Classification Search
CPC .......................... H04N 21/4316; G06V 20/46
See application file for complete search history.

(56) References Cited

U.S. PATENT DOCUMENTS

| | | | |
|---|---|---|---|
| 10,095,390 B1 * | 10/2018 | Lewis | H04N 21/8455 |
| 2011/0314380 A1 * | 12/2011 | Pritchett | H04N 21/23412 |
| | | | 715/723 |
| 2017/0186241 A1 | 6/2017 | Zavesky | |
| 2020/0134320 A1 | 4/2020 | Crossley et al. | |
| 2020/0314465 A1 | 10/2020 | Iyer et al. | |
| 2021/0090449 A1 | 3/2021 | Smith et al. | |

OTHER PUBLICATIONS

Extended European Search Report directed to related European Patent Application No. 24163176.1, dated Jul. 11, 2024; 9 pages.

* cited by examiner

*Primary Examiner* — Michael H Hong
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for inserting objects in real-time into content based on frame identifiers. An example embodiment operates by identifying a first object in a frame of a content and generating an identifier for the first object in the frame. The identifier includes an array of numbers representing context and visual features of the first object in the frame. The example embodiments further operates by identifying a second object based on the array of numbers representing the first object and inserting the second object into the frame of the content.

20 Claims, 16 Drawing Sheets

REAL-TIME OBJECTS INSERTION INTO CONTENT BASED ON FRAME IDENTIFIERS

BACKGROUND

Field

This disclosure is generally directed to real-time insertion of objects into content during playback of the content, and more particularly to inserting personalized and localized objects in real-time into one or more frames of content during playback of the content based on identifiers of the one or more frames.

Background

A typical media system operates to receive and play out (e.g., output for playout) an analog or digital media stream representing media content such as video and/or audio content and to output the media content and/or forward the stream for presentation of the content on a user interface such as a display screen and/or an audio speaker. In general, the multimedia content can be delivered from a content source device operated by a content provider to millions of viewers. Examples of the media systems include televisions, computer monitors, projection systems, loudspeakers, headphones, set top boxes (e.g. cable or satellite TV receivers), digital video recorders, radios, personal computers, gaming consoles, streaming media players, and the like.

By way of example, the media system could be a television (TV), which could receive a media stream (e.g., an over-the-air broadcast stream, a media stream output from a set top box, a media stream played from a digital storage medium, an Internet stream, or another such stream) and could present the media content of that stream to a viewer. TV can offer viewers access to content via subscription to cable or satellite services or through over-the-air broadcasts. As another example, the media system could be a set top box or digital video or audio recorder, which could receive a broadcast stream from a multi-channel video program distributor and/or from data storage and could output the media content of that stream via a high-definition multimedia interface (HDMI) cable or other interface to a television and/or audio/video receiver for playout. Numerous other examples are possible as well.

SUMMARY

Provided herein are system, apparatus, article of manufacture, method and/or computer program product embodiments, and/or combinations and sub-combinations thereof, for real-time insertion of objects into content based on frame identifiers. In some embodiments, an object identification system can identify an object in one or more frames of the content. The object identification system can generate an identifier for the identified object. In some embodiments, the identifier can include an array of numbers representing context and visual features of the identified object in the one or more frames. In some embodiments, the content may include streaming content. In some embodiments, the insertion may occur prior to content being streamed to a media device.

In some embodiments, the object identification system can identify a target object similar to the identified object based on the array of numbers. In some embodiments, the object identification system can identify a personalized and localized target object based on user preference and/or user location. In some embodiments, the object identification system can generate an additional array of numbers for the target object. The object identification system can identify the target object similar to the identified object by comparing the arrays of numbers for the identified object and the target object. In some embodiments, the comparison process can include determining a distance between the arrays of numbers for the identified object and the target object. In some embodiments, when the content is paused on the frame having the identified object, a content modification system can display the identified similar target object on the frame. For example, the identified similar target object may correspond to an item that is similar to the object identified within the frame and the displayed target object may be associated with an option to allow a user to purchase the target object.

In some embodiments, the object identification system can identify a target object based on the array of numbers and one or more content modification rules. In some embodiments, the object identification system can identify an appropriate surface on the identified object in the one or more frames. In some embodiments, an appropriate surface may be determined based on certain criteria such as whether there is a match between the surface of the identified object and the properties of the target object. For example, an appropriate surface for a logo target object may be a rectangular flat surface. In some embodiments, an appropriate surface may be a homogeneous surface. In some embodiments, a content modification system can insert the identified target object into the frame such that it is displayed on the homogeneous surface during playback of the content. In some embodiments, the content modification system can perform additional operations on the inserted target object to fit the target object on the homogeneous surfaces, such as resizing and rotation.

An example embodiment of a system can include a storage module and at least one processor each coupled to the storage module and configured to perform various operations to inserting objects in real-time into content based on frame identifiers. In an example, the at least one processor can be configured to identify an object in a frame of a content and generate an identifier for the identified object in the frame. In some embodiments, the object may be identified in one or more frames of the content. The identifier can include an array of numbers representing context and visual features of the identified object in the frame. Afterwards, the at least one processor can be configured to identify a target object based on the array of numbers representing the identified object. In addition, the at least one processor can be further configured to insert the second object into the frame of the content.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
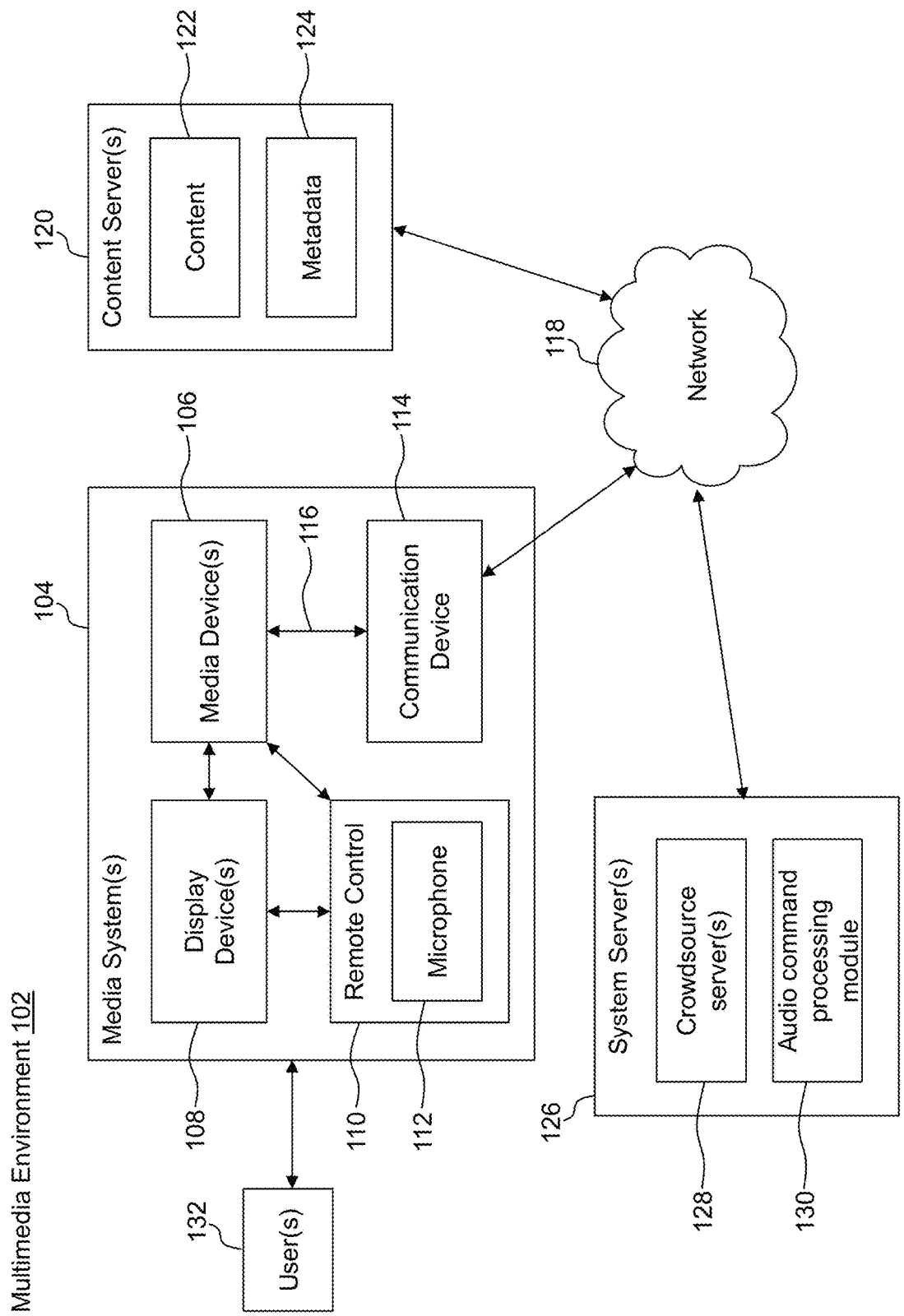
FIG. 1 illustrates a block diagram of a multimedia environment, according to some embodiments.

With the technology advances for multimedia and communication, many types of media content are readily available for streaming and/or display. For example, media content can be delivered via various communication technologies so that the media content can be easily accessed, watched, or listened to anywhere and anytime by viewers. Compared to the early days when media content may be limited to printed publications or delivered by radio, current media content can be available in various forms such as television shows, videos, movies, advertisements, audio files, text, etc., and any combination thereof. In general, media content may be referred to as content, which may include one or more content items, where one content item can include a plurality of scenes and each scene can include a sequence of frames.

Typically, media content includes advertisements inserted between certain frames or in one or more frames as a banner that is separate from the content in the frames. There are issues with these approaches. Advertisements between certain frames may interrupt the flow of the media content. Viewers may have to watch the advertisements and wait for the subsequent frames of the content. Advertisements as banners in one or more frames may obstruct critical visual aspects of the one or more frames, which may lower viewers' experience of the media content. How to effectively insert advertisements in media content without lowering viewers' experience can be of value to the viewers as well as the content creators. Additionally, typical advertisements in media content have time constraint or frame space constraint and may not take much of the time and frame space of the media content.

Provided herein are system, apparatus, device, method and/or computer program product embodiments, and/or combinations and sub-combinations thereof, for real-time insertion of personalized and localized objects into one or more frames of content. In some embodiments, the content can be processed to identify a first object in one or more frames of the content and generate an identifier for the one or more frames. In some embodiments, the processing of content may occur at a backend device prior to streaming the processed content to a media device. The identifier can include an array of numbers representing the context and visual features of the first object in the one or more frames. A second object can be identified based on the array of numbers representing the first object. In some embodiments, the second object can be an image, a logo, a string of text, a banner, a combination thereof, or other advertisement objects. A homogenous surface of the first object can be identified in the one or more frames. The homogenous surface can be marked as a frame object marker for object insertion. The frame object marker can be used to track object impressions during playback of the content. The second object can be inserted in real-time into the homogenous surface of the one or more frames. For example, in some embodiments, the second object can be an outfit, a furniture, a toy, an electronic device, or other advertisement merchandises. For example, in some embodiments, during a pause of the content on the one or more frames, the second object can be identified in real-time based on the identifier of the first object in the one or more frames and can be displayed on the one or more frames for viewers to purchase the advertisement merchandise that is associated with the second object. In some embodiments, the second object can be identified based on a preference of the viewer and/or a location of the viewer. The preference and location of the viewer can be obtained from a user account used for playback of the content. Hence, the inserted/displayed second object on the one or more frames of the content may not interrupt the flow of the content and can improve viewer's experience. In some embodiments, selection of the second object may be based on one or more parameters such as the characteristics of the homogenous surface, the characteristics of the first object, or characteristics of the content within the one or more frames. Additionally, additional advertisement objects can be inserted into more frames of the content without decreasing viewer's experience, thus increasing the time and space of advertisements in the content.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102 including a content modification system to insert in real-time to a frame of a content an object identified based on an identifier of the frame, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content, such as content 122. Viewers and users (and similar parties and entities) are used interchangeably in the current description.

Each media system 104 may include one or more media device(s) 106 each coupled to one or more display device(s) 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, a cable box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content server(s) 120 (also called content providers, channels, or sources). Although only one content server 120 is shown in FIG. 1, in practice the multimedia environment 102 may include any number of content server(s) 120. Each content server 120 may be configured to communicate with network 118. Content server 120, media device 106, display device 108, may be collectively referred to as a media system, which may be an extension of media system 104. In some embodiments, a media system may include system server 126 as well.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. Content 122 may be the source displayed on display device 108.

In some embodiments, metadata 124 comprises data about content 122. For example, metadata 124 may include associated or ancillary information indicating or related to identifiers for each frame of content 122, writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index. In some embodiments, content 122 can include a plurality of content items, each content item can include a plurality of scenes, and each scene can include a plurality of frames having metadata about the corresponding frame (see FIG. 3).

The multimedia environment 102 may include one or more system server(s) 126. The system server(s) 126 may operate to support the media device(s) 106 from the cloud. It is noted that the structural and functional aspects of the system server(s) 126 may wholly or partially exist in the same or different ones of the system server(s) 126. System server(s) 126 and content server 120 together may be referred to as a media server system. An overall media system may include a media server system and media system 104. In some embodiments, a media system may refer to the overall media system including the media server system and media system 104.

The media device(s) 106 may exist in thousands or millions of media systems 104. Accordingly, the media device(s) 106 may lend themselves to crowdsourcing embodiments and, thus, the system server(s) 126 may include one or more crowdsource server(s) 128.

For example, using information received from the media device(s) 106 in the thousands and millions of media systems 104, the crowdsource server(s) 128 may identify similarities and overlaps between closed captioning requests issued by different user(s) 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie. In some embodiments, crowdsource server(s) 128 can be located at content server 120. In some embodiments, some part of content server 120 functions can be implemented by system server 126 as well.

The system server(s) 126 may also include an audio command processing module 130. As noted above, the remote control 110 may include a microphone 112. The microphone 112 may receive audio data from user(s) 132 (as well as other sources, such as the display device 108). In some embodiments, the media device 106 may be audio responsive, and the audio data may represent verbal commands from the user(s) 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system server(s) 126. The audio command processing module 130 may operate to process and analyze the received audio data to recognize the user(s) 132's verbal command. The audio command processing module 130 may then forward the verbal command back to the media device 106 for processing.

Figure 2:
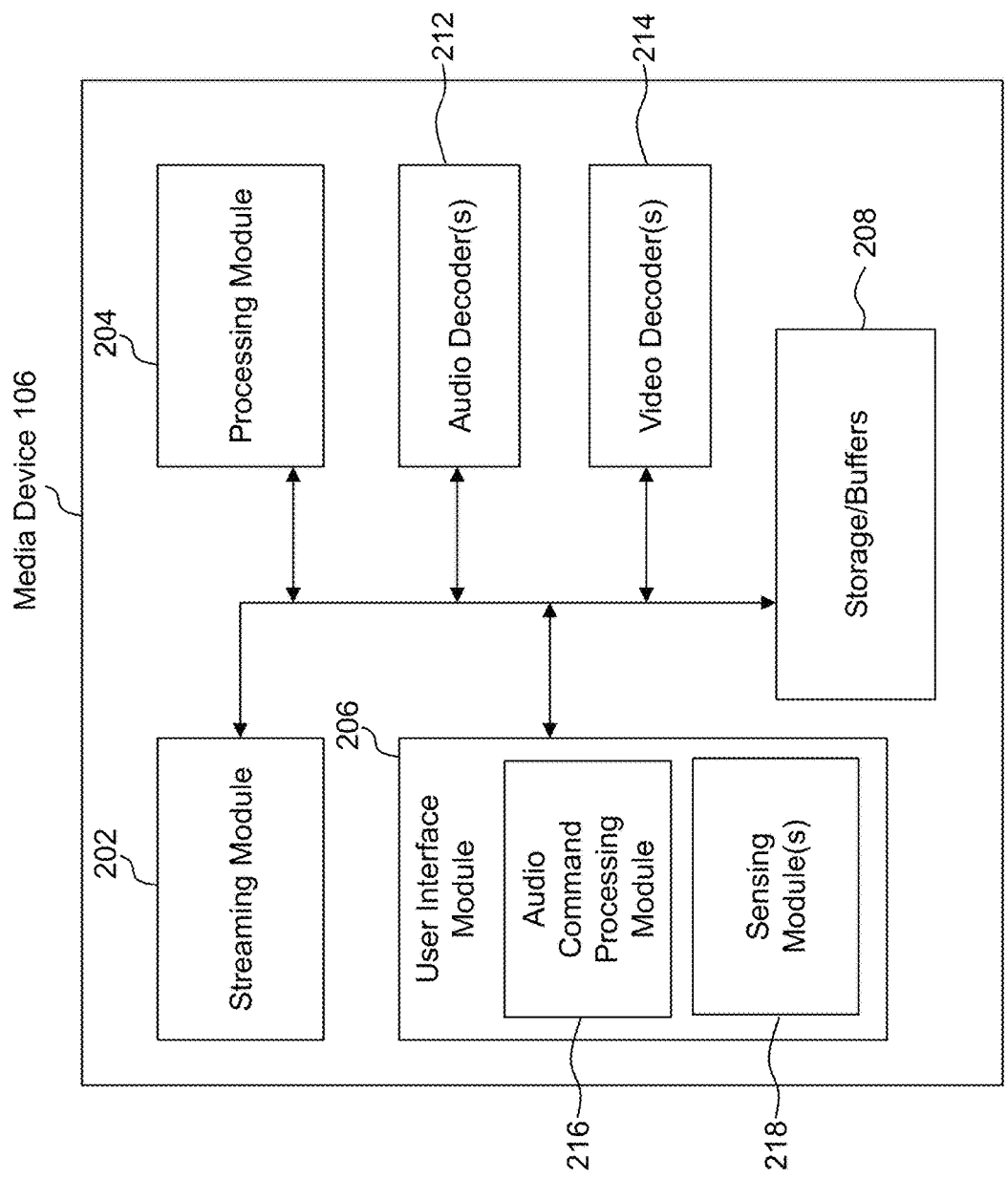
FIG. 2 illustrates a block diagram of a media device, according to some embodiments.

In some embodiments, the audio data may be alternatively or additionally processed and analyzed by an audio command processing module 216 in the media device 106 (see FIG. 2). The media device 106 and the system server(s) 126 may then cooperate to pick one of the verbal commands to process (either the verbal command recognized by the audio command processing module 130 in the system server(s) 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, user interface module 206 may include audio command processing module 216 and one or more sensing module(s) 218. In some embodiments, sensing module(s) 218 can include cameras, microphones, infra-red sensors, and touch sensors, to name just some examples. Sensing module(s) 218 can capture image and audio signals within a vicinity of sensing module(s) 218.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user(s) 132 may interact with the media device(s) 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user(s) 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Figure 3:
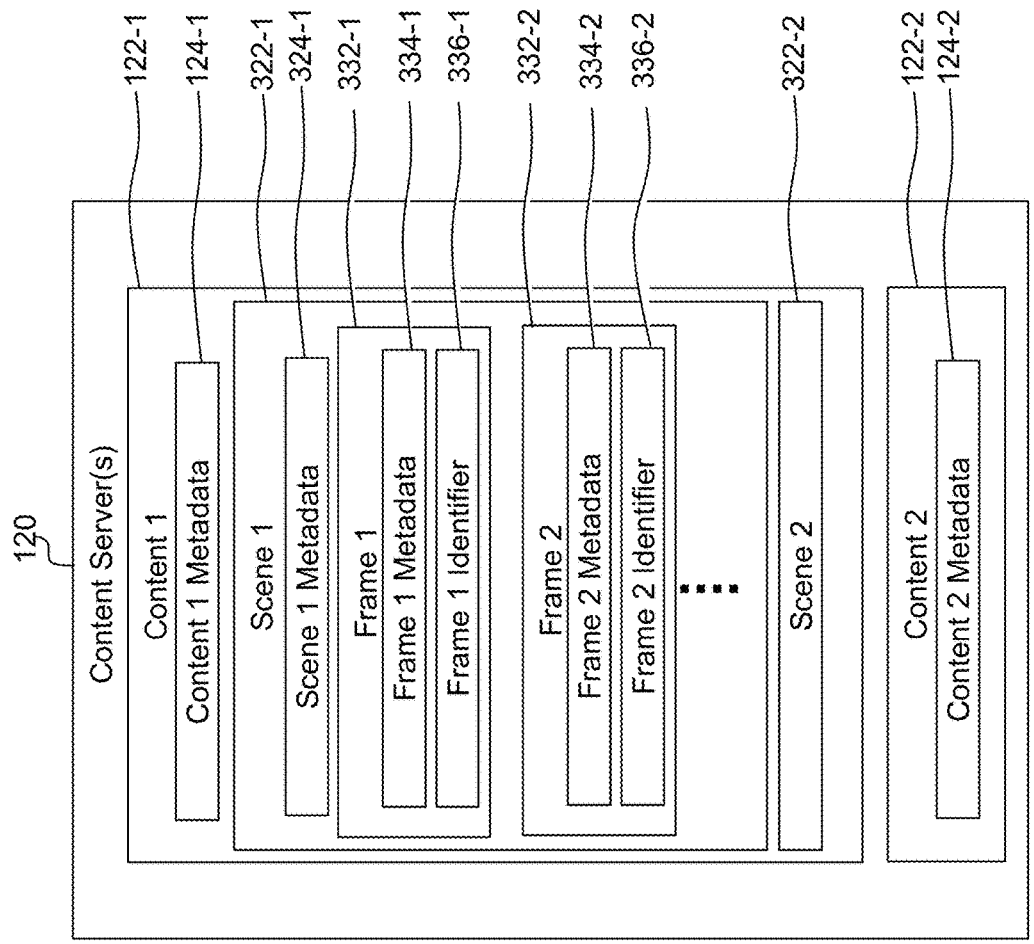
FIG. 3 illustrates a block diagram of a content server storing content with frame identifiers, according to some embodiments.

FIG. 3 illustrates a block diagram of content server(s) 120 storing content with frame identifiers, according to some embodiments. As shown in FIG. 3, content server(s) 120 can include a plurality of content items, such as content 122-1 and content 122-2. Content 122-2 can have a similar structure as content 122-1. Though FIG. 3 illustrates two content items in content server(s) 120, content server(s) 120 can include more than two content items having a similar structure as content 122-1. The discussion of elements of content 122-1 applies to content 122-2, unless mentioned otherwise. And like reference numerals generally indicate identical, functionally similar, and/or structurally similar elements.

In some embodiments, as shown in FIG. 3, content 122-1 can include content metadata 124-1. Similarly, content 122-2 can include content metadata 124-2. In some embodiments, content 122-1 can include a plurality of scenes, such as scene 322-1 and scene 322-2. Content 122-2 can have a similar structure as content 122-1. In some embodiments, each scene can include a plurality of frames. As an example, scene 322-1 can include frame 332-1 and frame 332-2. Scene 322-2 can have a similar structure as scene 322-1. Scene 322-1 can include scene metadata 324-1. Frame 332-1 can further include frame metadata 334-1 and frame identifier 336-1. In some embodiments, frame identifier 336-1 can be included in frame metadata 334-1. Similarly, frame 332-2 can further include frame metadata 334-2 and frame identifier 336-2.

In some embodiments, frame metadata 334-1 and 334-2, and content metadata 124-1 and 124-2 may include associated or ancillary information similar to content metadata 124 as described above. In some embodiments, the associated and ancillary information can be generated by the content creators or by content server(s) 120. In some embodiments, frame metadata 334-1 and 334-2 may include color contrast, brightness, histogram of color spectrum, a number of objects, a trajectory of objects contained in frames 332-1 and 332-2, or a frame feature contained in frames 332-1 and 332-2. Scene metadata 324-1 related to scene 322-1 may include information about objects, people, places, actions, genre, time-frame, caption data text of scene 322-1, and audio information related to scene 322-1. The time-frame information can include an approximate time of a scene occurring from one frame to another frame. In some embodiments, the time-frame information can help identify an object in a particular scene. In some embodiments, Content metadata 124-1 and 124-2 related to respective content 122-1 and 122-2 can include information about respective genre of the content, keywords, a description, and reviews of content 122-1 and 122-2.

Figure 7:
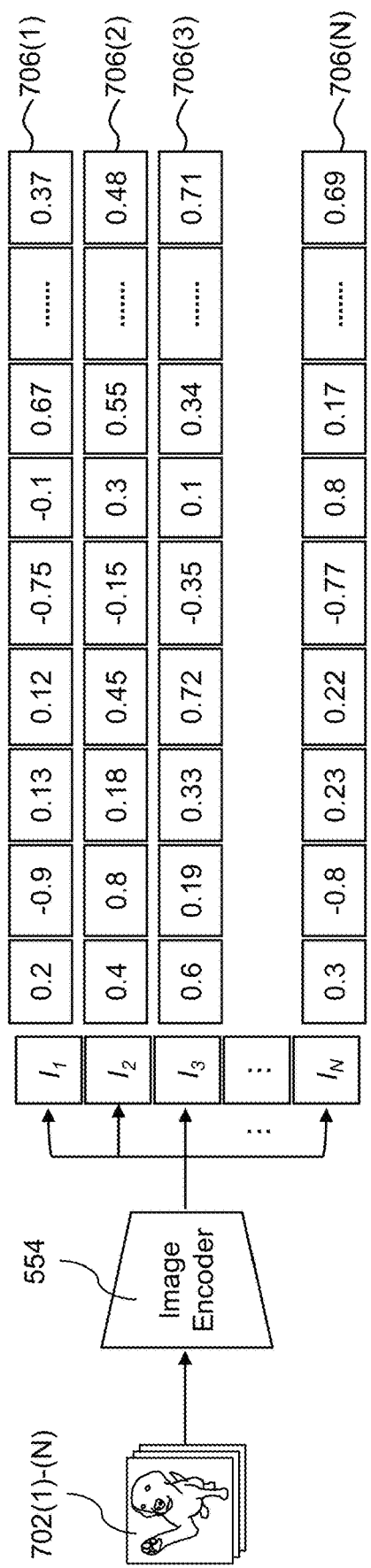
FIG. 7 illustrates identifier generation for one or more images, according to some embodiments.

Frame identifiers 336-1 and 336-2 can include context and visual features of objects in frames 332-1 and 332-2, such as object locations in frames 332-1 and 332-2. In some embodiments, each of frame identifiers 336-1 and 336-2 can be a matrix having an array of numbers to represent the context and visual features of objects in frames 332-1 and 332-2. For example, as shown in FIG. 7, images 702(1)-(N) can be represented by identifiers 706(1)-(N). In some embodiments, the numbers in the arrays of identifiers 706(1)-(N) can indicate a number of objects, a trajectory of objects, a category of objects, color, size, location, and background of objects, and other semantic and visual features of the objects in corresponding images 702(1)-(N).

In some embodiments, frames 332-1 and 332-2 can be pre-processed and frame identifiers 336-1 and 336-2 can be generated to represent context and visual features of objects in frames 332-1 and 332-2, for example, as shown in FIG. 7. In some embodiments, frame identifiers 336-1 and 336-2 can be provided by the content provider and can be associated with respective frames 332-1 and 332-2.

Figure 4:
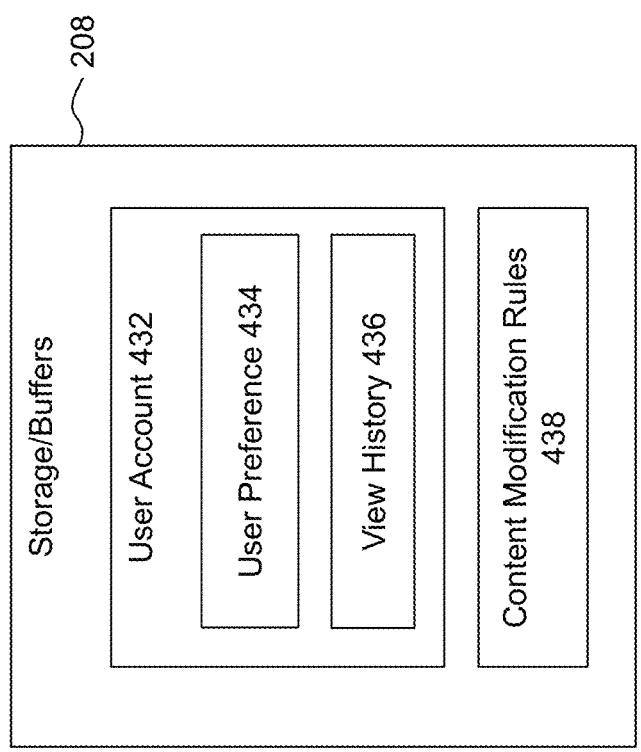
FIG. 4 illustrates a storage module that stores information relating to user accounts and content modification rules, according to some embodiments.

FIG. 4 illustrates storage/buffers 208 that stores information relating to user accounts and content modification rules, according to some embodiments. As shown in FIG. 4, storage/buffers 208 can include one or more content modification rules 438 and one or more user accounts, such as user account 432. User account 432 may be shared and accessible among multiple users, such as one or more members of a household. User account 432 can further include user preference 434 and view history 436. User preference 434 may be related to all the members of the household. In some embodiments, user preference 434 can include respective user preferences for each member of the household associated with user account 432. User preference 434 can be related to and store information about user settings of media systems 104 and media content by user(s) 132 accessed through user account 432. For example, user preference 434 may include user preferred image properties and sound effects, user's favorite genres, and other user requirements and settings. Additionally, user preference 434 can include one or more images and/or one or more audio recordings of user(s) 132 for user identification.

View history 436 can include information related to media content viewed by user(s) 132, for example, the name of a show user(s) 132 viewed, a time user(s) 132 viewed the show, a frame user stopped viewing, and other related information. In some embodiments, view history 436 can include a portion of content 122 being viewed by user(s) 132.

Content modification rules 438 can include rules to modify content 122 to be played on display device(s) 108. In some embodiments, content modification rules 438 can include rules for inserting an object into one or more frames of content 122. In some embodiments, the inserted object can be an image, a logo, a string of text, a banner, a combination thereof, or other advertisement objects. In some embodiments, content modification rules 438 can include a list of appropriate object categories for insertion into identified objects in the one or more frames. For examples, content modification rules 438 may specify furniture categories for the frames including identified tables. In some embodiments, content modification rules 438 can include locating, sizing, rotating, and other operations of the inserted object to fit the inserted object onto the identified object in the frames.

Content Modification Based on Identified Objects

Figure 5:
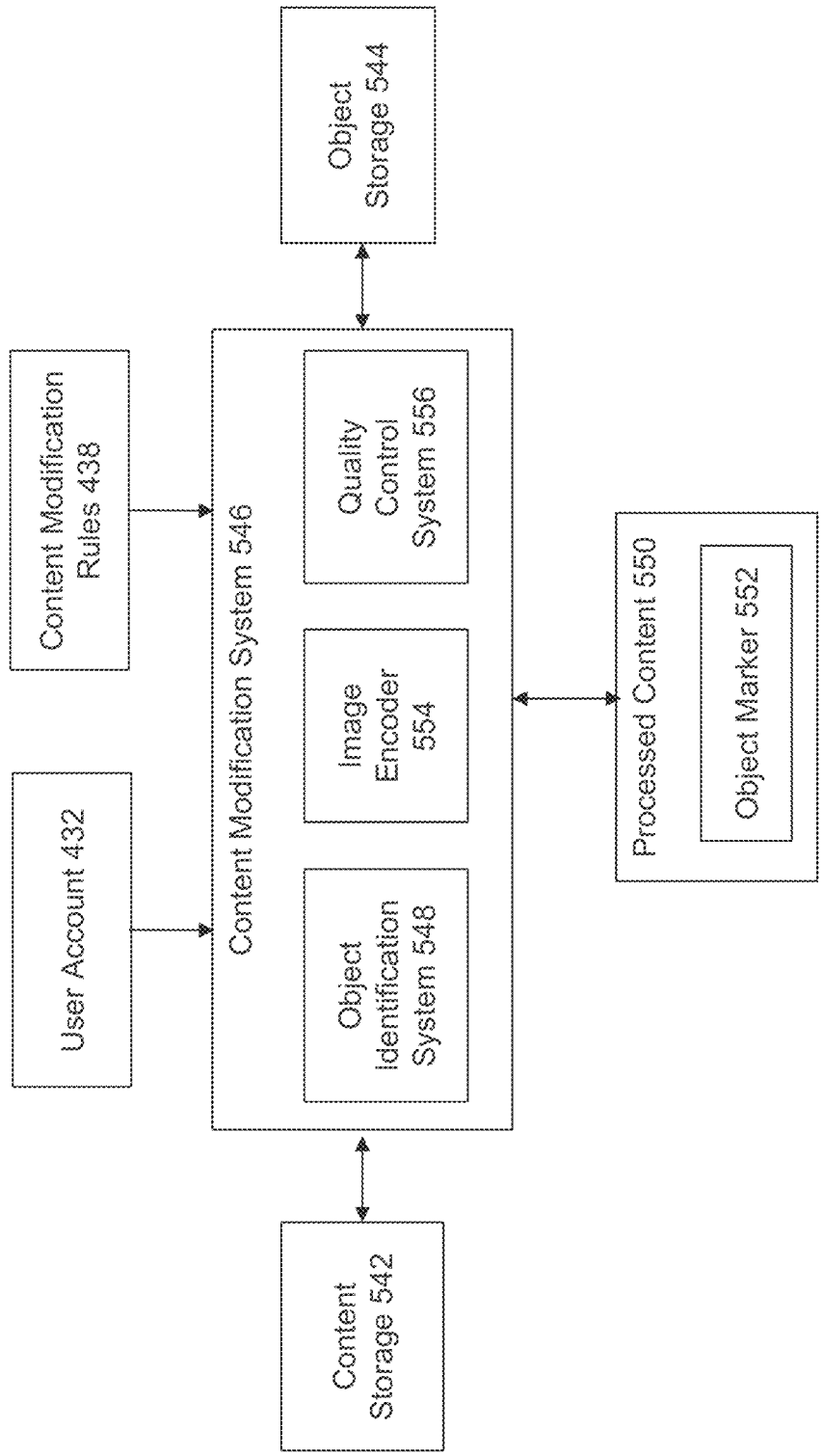
FIG. 5 illustrates a block diagram of a system for inserting personalized and localized objects in real-time into a content based on identifiers for one or more frames of the content, according to some embodiments.

FIG. 5 illustrates a block diagram of a system 500 for inserting personalized and localized objects in real-time into a content based on identifiers for one or more frames of the content, according to some embodiments. As shown in FIG. 5, system 500 can include user account 432, content modification rules 438, content storage 542, object storage 544, content modification system 546, and processed content 550 with object marker 552. Content modification system 546 can further include object identification system 548, image encoder 554, and quality control system 556.

In some embodiments, content storage 542 can store one or more media content for processing. Examples of media content can include any combination of music, videos, movies, TV programs, multimedia, images, still pictures, text, graphics, gaming applications, advertisements, programming content, public service content, government content, local community content, software, and/or any other content or data objects in electronic form. In some embodiments, content storage 542 can be located on content server(s) 120 as shown in FIG. 1 and/or storage/buffers 208 as shown in FIG. 2.

In some embodiments, object storage 544 can include target objects to be inserted into media content. Object storage 544 can store any combination of images, still pictures, text, graphics, logos, banners, outfits, furniture, toys, electronic devices, and/or any other advertisement objects in electronic form. In some embodiments, object storage 544 can be located on content server(s) 120 as shown in FIG. 1 and/or storage/buffers 208 as shown in FIG. 2.

Figure 6:
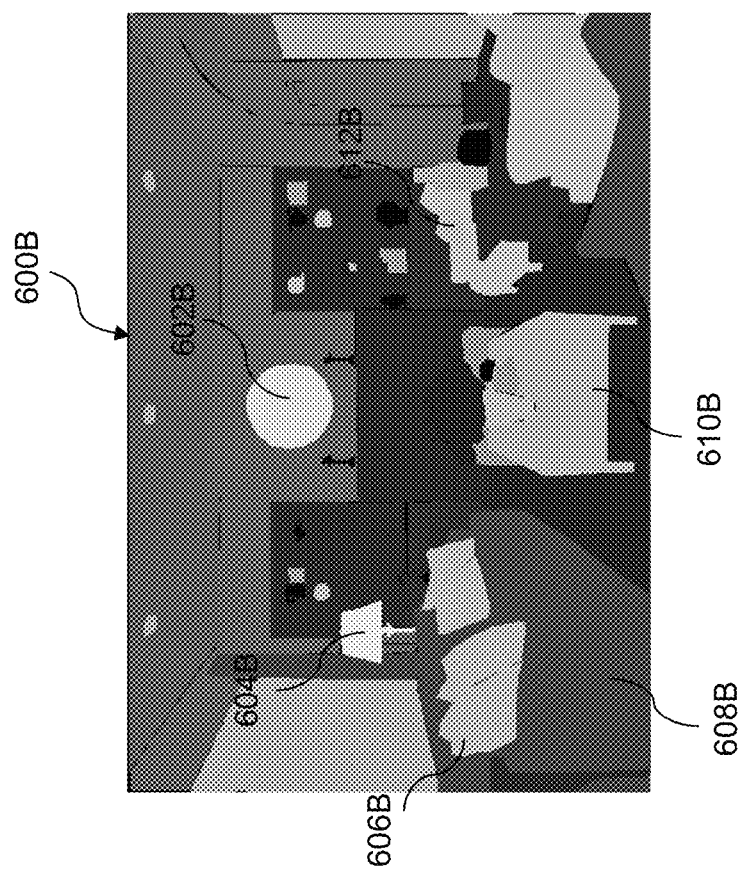
FIG. 6 illustrates an example of image segmentation, according to some embodiments.
Figure 6:
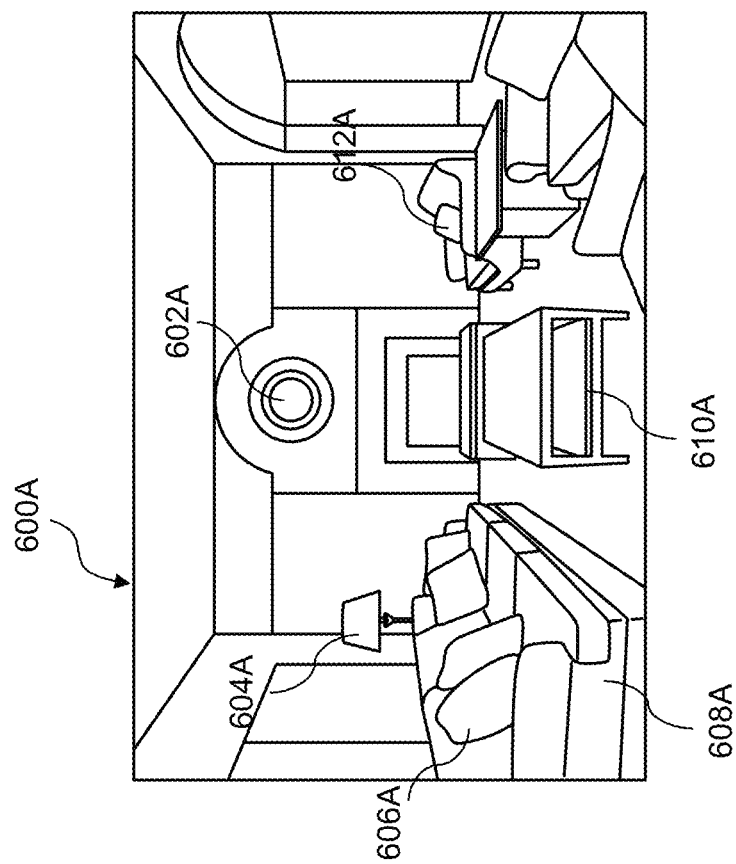

In some embodiments, content modification system 546 can be located on content server(s) 120 as shown in FIG. 1 and/or storage/buffers 208 as shown in FIG. 2. In some embodiments, content modification system 546 can process media content in content storage 542 to identify objects in the frames of the media content with object identification system 548. In some embodiments, object identification system 548 can identify the objects in an image using computer vision image segmentation algorithms. For example, as shown in FIG. 6, original image 600A can include a mirror 602A, a lamp 604A, a pillow 606A, a large sofa 608A, a table 610A, a small sofa 612A, and other objects in a living room setting. Object identification system 548 can recognize the living room setting and the objects based on the context and visual features of original image 600A. Object identification system 548 can further generate segmented image 600B and can identify mirror 602B, lamp 604B, pillow 606B, large sofa 608B, table 610B, small sofa 612B, and other objects in segmented image 600B. In some embodiments, object identification system 548 can generate segmented image 600B using a machine learning model trained to recognize objects in images, such as original image 600A. In some embodiments, the machine learning model can recognize the objects based on any text description in original image 600A. In some embodiments, the machine learning model can recognize the objects based on any metadata associated with original image 600A. In some embodiments, the machine learning model can be trained with modified images. For example, an object in an image can be removed from the image, variations of the object can be filled back into the image. The machine learning model can be trained to recognize the variations and similarities of the objects.

In some embodiments, content modification system 546 can generate an identifier for an image with image encoder 554 to represent context and visual features of the objects in the image. For example, as shown in FIG. 7, image encoder 554 can generate identifiers 706(1)-(N) for images 702(1)-(N). Identifiers 706(1)-(N) can also be referred to as $I_1$ to $I_N$. In some embodiments, as shown in FIG. 7, identifiers 706(1)-(N) can have arrays of numbers representing context and visual features of the objects in respective images 702(1)-(N). For example, the number matrix in identifier 706(1) can represent a dog in image 702(1), a location of the dog, a color of the dog, and other features of the dog in image 702(1). In some embodiments, the array of numbers in identifiers 706(1)-(N) can have multiple dimensions, for example, 512 dimensions. Each dimension can represent one or more features of the object in corresponding images 702(1)-(N). In some embodiments, a combination of multiple dimensions can represent one or more features of the object in corresponding images 702(1)-(N). In some embodiments, a value of the number in each dimension can be a binary value of 0 or 1 and can be a decimal value ranging from about −1 to about 1. The value differences of one number across the arrays of numbers in identifiers 706(1)-(N) can represent variations of the one or more features of the object across images 702(1)-(N). In some embodiments, an array of numbers can be referred to as "an embedding" for a corresponding image. In some embodiments, identifies 706(1)-(N) can include a matrix of numbers of multiple dimensions, In some embodiments, each of identifiers 706(1)-(N) can be treated as a fingerprint or a signature of corresponding images 702(1)-(N). In some embodiments, the machine learning model can recognize the objects in images 702(1)-(N) and generate identifiers 706(1)-(N) for corresponding images 702(1)-(N). In some embodiments, identifiers 706(1)-(N) can be embedded in images 702(1)-(N) as metadata. In some embodiments, identifiers 706(1)-(N) can be a part of metadata of corresponding images 702(1)-(N).

Figure 8:
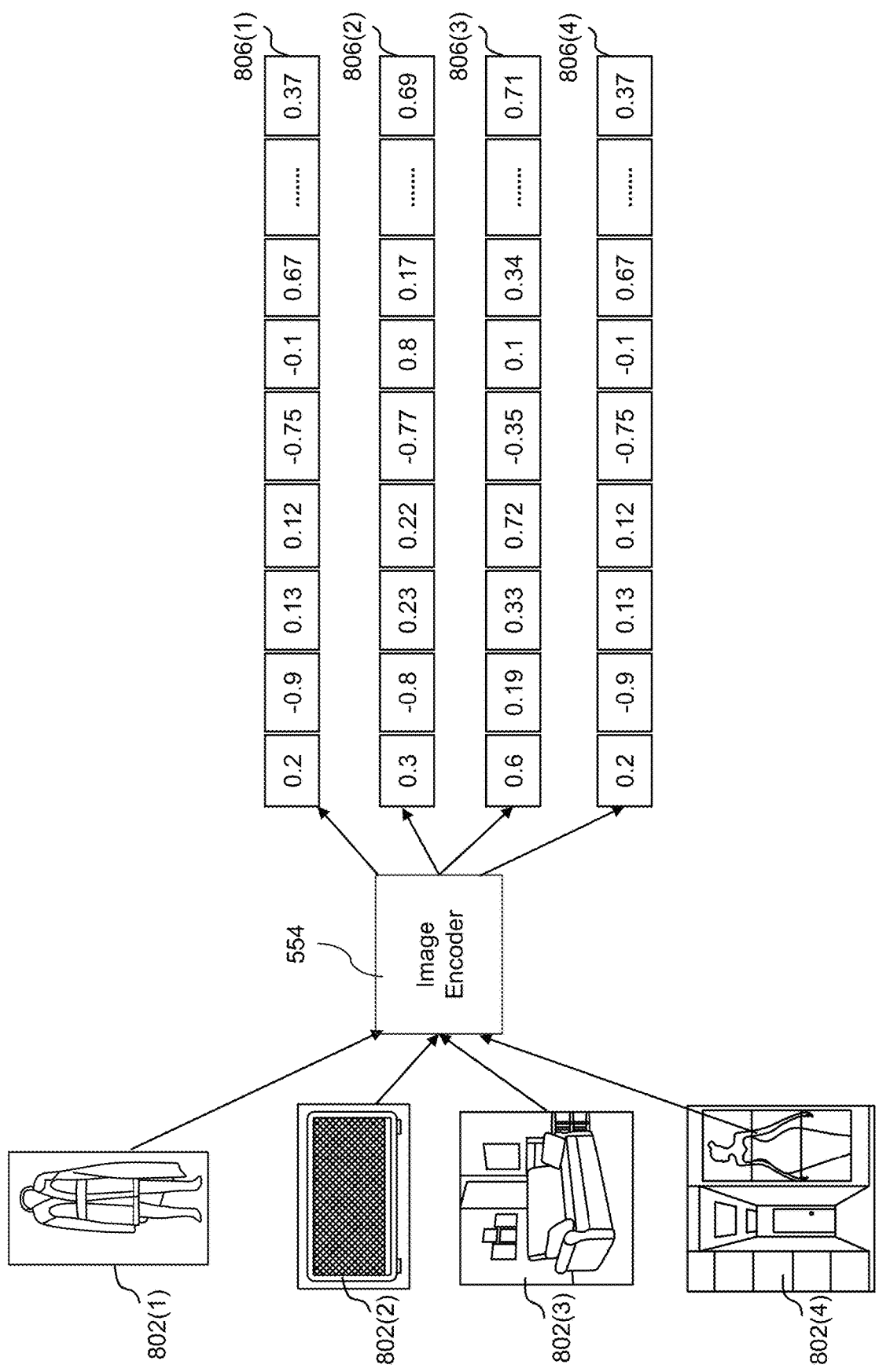
FIG. 8 illustrates identifier generation for one or more target objects, according to some embodiments.

In some embodiments, content modification system 546 can generate an identifier for a target object with image encoder 554. For example, as shown in FIG. 8, image encoder 554 can recognize target objects 802(1), 802(2), 802(3), and 802(4), and generate identifiers 806(1), 806(2), 806(3), and 806(4) having arrays or numbers to represent corresponding target objects. Similarly, in some embodiments, identifiers 806(1)-(4) can be embedded in target objects 802(1)-(4) as fingerprints for corresponding target objects. In some embodiments, identifiers 806(1)-(4) can be a part of metadata of corresponding target objects 802(1)-(4).

Figure 9:
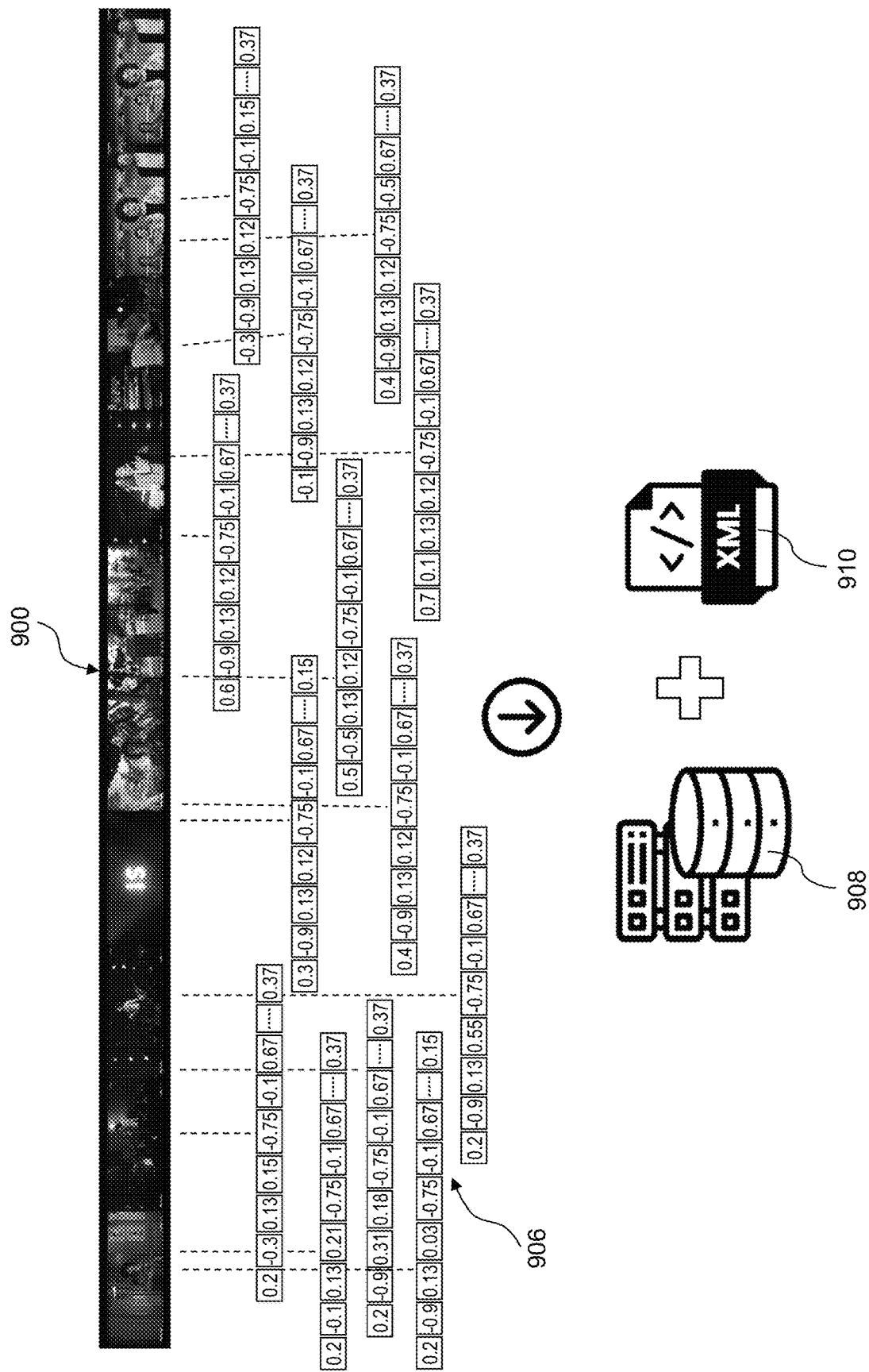
FIG. 9 illustrates a processed content with identifiers for one or more frames, according to some embodiments.

In some embodiments, content modification system 546 can generate identifiers for one or more frames of a media content with image encoder 554. The identifiers can represent the context and visual features of identified objects in the frames. For example, as shown in FIG. 9, content modification system 546 can identify objects in one or more frames of media content 900 and generate identifiers 906 having arrays of numbers for the one or more frames. In some embodiments, though identifiers 906 can have similar array or numbers for each frame of media content 900 as shown in FIG. 9, identifiers 906 for each frame of media content 900 can have different array of numbers. In some embodiments, media content 900 can be preprocessed by content modification system 546 and identifiers 906 can be embedded in the frames of processed media content 908. In some embodiments, identifiers 906 for the frames can be stored in a file 910 (e.g., an XML file) associated with processed media content 908. In some embodiments, file 910 can be included in metadata of the frames of media content 900. In some embodiments, a new standard can be set up for processed media content 908 with embedded identifiers 906 or associated file 910 including identifiers 906. File 910 may contain information identifying identified objects within frames within a scene. In some embodiments, the information may be organized based on different scenes (i.e., sequence of frames), based on object type or identifier, or some other parameter for organizing the object information. File 910 may then be associated with each media content; for example, there may be a file for a particular movie or episode of a TV show such that the file may be utilized to provide object information whenever the media content is requested for streaming. File 910 may therefore be utilized to avoid having to process the requested media content at run-time.

Figure 10:
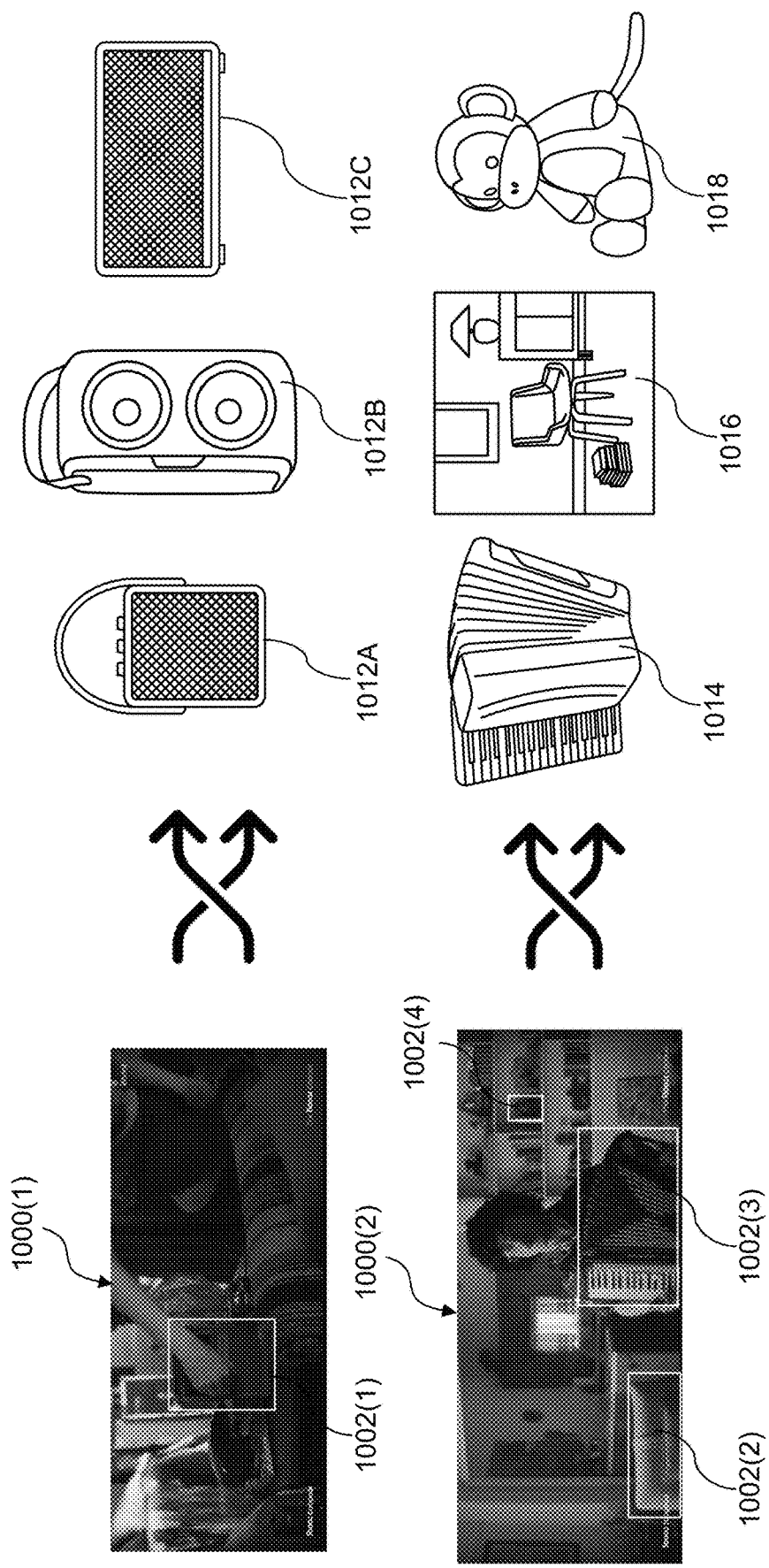
FIG. 10 illustrates identification of one or more target objects based on identified objects in a frame of a content, according to some embodiments.

In some embodiments, content modification system 546 can identify target objects similar to the identified objects in an image with object identification system 548. For example, as shown in FIG. 10, object identification system 548 can segment original images 1000(1) and 1000(2) and recognize the objects in original images 1000(1) and 1000(2), such as identified objects 1002(1)-(4). Image encoder 554 can generate identifiers for original images 1000(1) and 1000(2) including identified objects 1002(1)-(4). In some embodiments, Image encoder 554 can further generate identifiers for identified objects 1002(1)-(4). Based on the identifiers of identified objects 1002(1)-(4), object identification system 548 can identify target objects 1012A, 1012B, 1012C similar to identified object 1002(1), target object 1014 similar to identified object 1002(3), target object 1016 similar to identified object 1002(2), and target object 1018 similar to identified object 1002(4). In some embodiments, object identification system 548 can retrieve original images 1000(1) and 1000(2) from content storage 542. In some embodiments, object identification system 548 can identify target objects 1012A-C, 1014, 1016, and 1018 in object storage 544.

In some embodiments, object identification system 548 can identify similar objects using a machine learning model. In some embodiments, the machine learning model can compare the identifiers of the identified objects and the target objects to find target objects in object storage 544 similar to the identified objects. For example, object identification system 548 can compare the identifiers (e.g., arrays of numbers) of identified object 1002(1) with target object identifiers in object storage 544 and identify similar target objects 1012A, 1012B, and 1012C. In some embodiments, the comparison process can include computing a maximum deviation between the arrays of numbers for the identified objects and the target object, and determine if the maximum deviation is within a predefined tolerance. In some embodiment, if the arrays of numbers are binary values, the comparison process can include computing a Boolean determination or a Hamming distance (as a count of mismatches between respective bit locations in the arrays of numbers). In some embodiment, if the arrays of numbers are decimal values as shown in identifiers 906, the comparison process can include determining a distance, such as a Euclidean distance, between the arrays of numbers.

In some embodiments, object identification system 548 can iterate the comparison process to find appropriate target objects similar to the identified objects. For example, as shown in FIG. 10, after first iteration, target objects 1012A-C can be identified for identified object 1002(1) and target object 1018 can be identified for identified object 1002(4). After additional iterations, object identification system 548 may rank target objects 1012A-C according to their similarities to identified object 1002(1). Target object 1012A may be identified as the most similar target object for identified object 1002(1). Additionally, after more iterations, object identification system 548 may determine that though target object 1018 and identified object 1002(4) are in a same category of stuffed toys, they actually have different animal figures and thus may not be similar objects.

Figure 11:
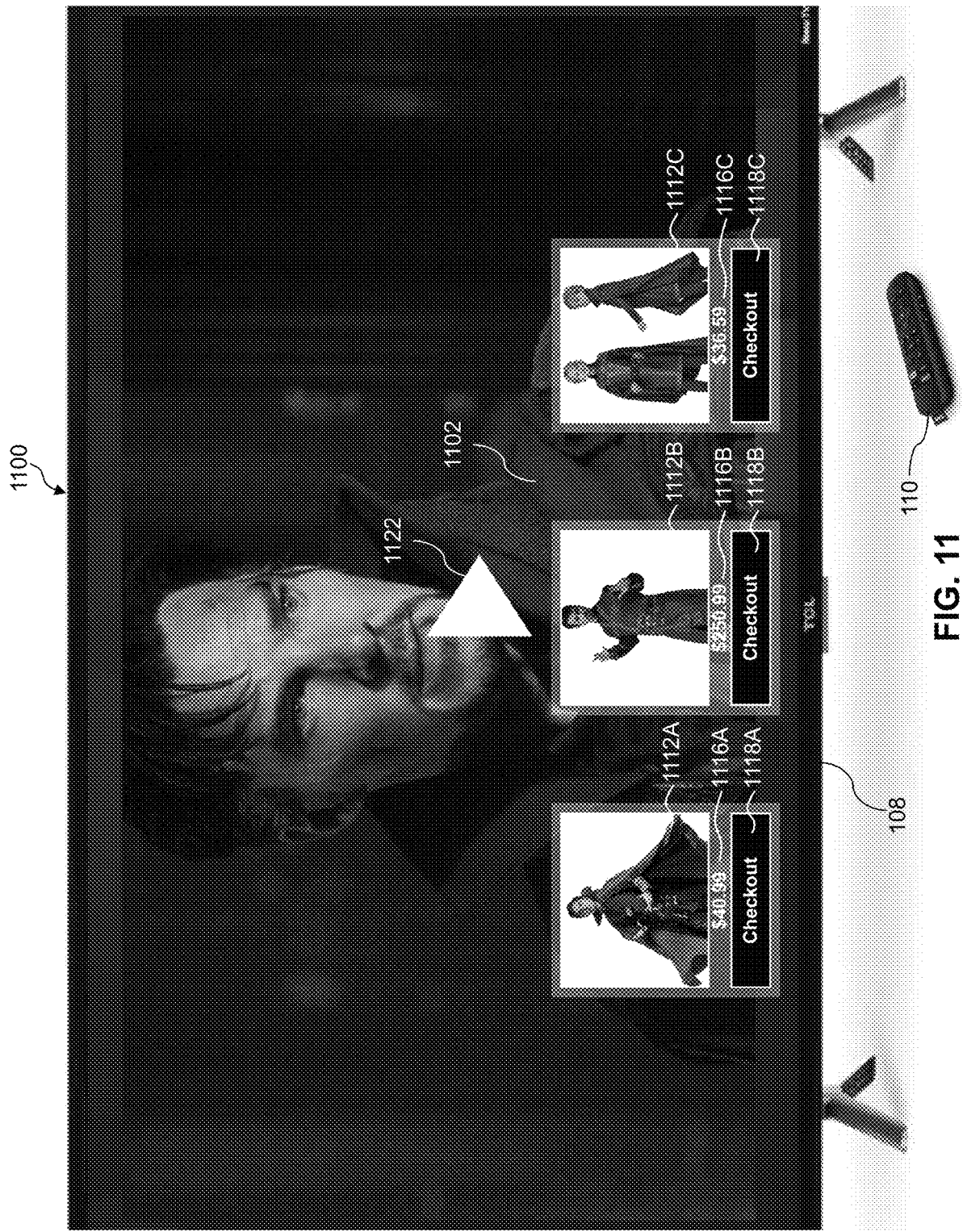
FIG. 11 illustrates display of target objects based on an identified object in a frame in a content during a pause of the content on the frame, according to some embodiments.

In some embodiments, content modification system 546 can insert the identified similar target objects into the frame having identified objects. For example, as shown in FIG. 11, during playback of a media content on display device 108, the media content may be paused on frame 1100 by a viewer. In some embodiments, object identification system 548 can segment and identify object 1102 (e.g., an outfit) on frame 1100. Object identification system 548 can further identify target objects 1112A-C (e.g., similar outfits) similar to identified object 1102. Target objects 1112A-C can be inserted to frame 1100 and can be displayed on display device 108 to the viewer. As target objects 1112A-C are be presented on display device 108 during a pause of the media content, target objects 1112A-C may not interrupt the flow of the media content and the viewer's experience can be improved. Additionally, as shown in FIG. 11, price tags 1116A-C and checkout links 1118A-C can be displayed together with corresponding target objects 1112A-C, which can provide convenience for the viewer to buy target objects 1112A-C and promote the sales of target objects 1112A-C. After play button 1122 is clicked, playback of the media content can continue on display device 108 and target objects 1112A-C may not be displayed during the playback.

In some embodiments, object identification system 548 can identify similar target objects personalized and localized for the viewer. For example, as shown in FIG. 5, content modification system 546 may retrieve user preference 434 and view history 436 from user account 432. Object identification system 548 can identify personalized similar target objects in object storage 544 based on the identified objects in the original content, user preference 434, and view history 436. In some embodiments, content modification system 546 can determine a location of the viewer from user account 432 and use the viewer's location to identify similar target objects in the local area.

In some embodiments, object identification system 548 can identify similar target objects using audio information of the media content. For example, object identification system 548 can obtain the audio information for multiple frames prior to paused frame 1100. In some embodiments, object identification system 548 can capture the audio information with sensing modules(s) 218 shown in FIG. 2. In some embodiments, object identification system 548 can process the audio information and identify similar target objects in object storage 544 based on the audio information. For example, characters in the media content may talk about a stuffed toy monkey prior to the pause on frame 1100, content modification system 546 can identify target object 1018 in object storage 544 and display target object 1018 on paused frame 1100.

In some embodiments, content modification system 546 can identify an appropriate surface on identified objects in one or more frames and insert identified target objects onto the appropriate surface of the identified objects. In some embodiments, an appropriate surface may be determined based on visual characteristics of the target object (e.g., round, rectangular, flat, curved, dimensions) and the visual characteristics of the appropriate surface. In some embodiments, content modification system 546 may identify a surface in the one or more frames based on matching the visual characteristics of the surface and the target object. In some embodiments, the appropriate surface can be marked as a frame object marker in the one or more frames for object insertion. In some embodiments, the frame object marker can be in the form of XML, JSON, or other suitable data formats and can be included in metadata of the one or more frames, for example, as shown in FIG. 9.

Figure 12:
FIG. 12 illustrates identification of a homogenous surface on an identified object in a frame, according to some embodiments.

In some embodiments, the appropriate surface may be identified as a homogeneous surface. In some embodiments, a homogeneous surface can have uniform properties (e.g., color, contrast, texture, dimensions) across the surface. For example, as shown in FIG. 12, during playback of a media content on display device 108, object identification system 548 can segment frame 1200 and identify object 1202 (e.g., a mailbox) in frame 1200. Object identification system 548 can further identify homogeneous surface 1204 on identified object 1202 in frame 1200. Content modification system 546 can insert appropriate target objects on homogeneous surface 1204. In some embodiments, homogeneous surface 1204 can have any shape, such as a square, a rectangle, a circle, an oval, and a triangle. In some embodiments, homogeneous surface 1204 may not have text or images.

In some embodiments, object identification system 548 can identify appropriate target objects in object storage 544 based on content modification rules 438 and/or user account 432, as shown in FIG. 5. For example, object identification system 548 may identify target objects having an appropriate dimension for homogeneous surface 1204 (as noted above), and/or an appropriate category for identified object 1202. For example, identified objects and target objects may be organized into categories (e.g., apparel, electronic devices, furniture, toys) and a target object may be identified based on matching the categories of the identified object 1202 and the target object. Content modification system 546 can insert the identified appropriate target object on homogeneous surface 1204. In some embodiments, content modification system 546 can perform additional manipulations on the inserted target objects, for example, rotation, resizing, and so on.

Figure 13:
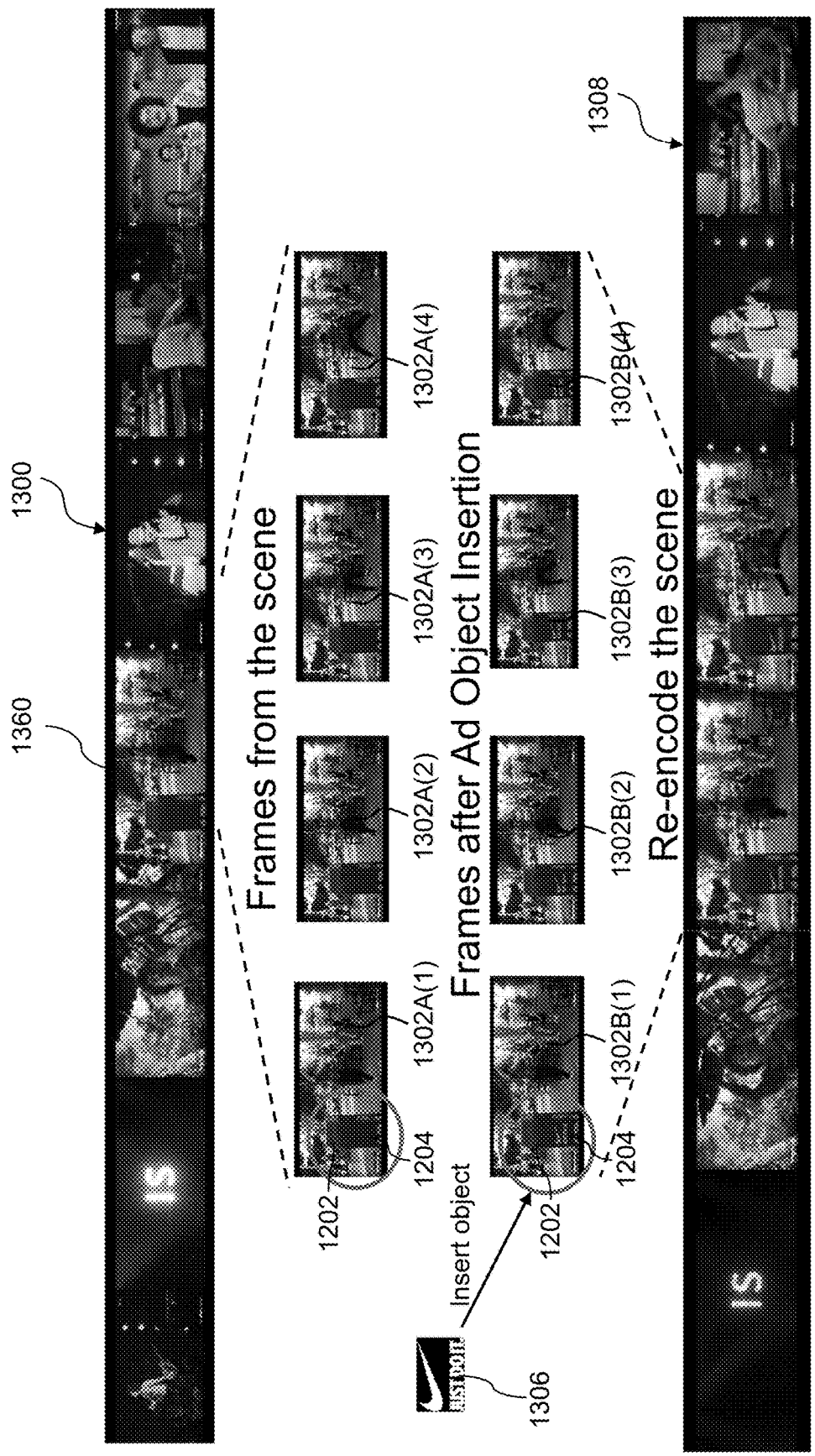
FIG. 13 illustrates inserting an ad object on an identified homogenous surface in one or more frames of a content, according to some embodiments.

In some embodiments, the target objects can be displayed on homogeneous surface 1204 in multiple frames during playback of the media content without interrupting the flow of the media content. For example, as shown in FIG. 13, media content 1300 can include a plurality of scenes, such as scene 1360. Scene 1360 can include a plurality of frames 1302A(1)-(4). In some embodiments, content modification system 546 can identify homogeneous surface 1204 on identified object 1202 in frames 1302A(1)-(4). Content modification system 546 can further identify appropriate target objects to insert on homogeneous surface 1204, such as ad object 1306 shown in FIG. 13. After the insertion, modified frames 1302B(1)-(4) can include ad object 1306 marked on homogeneous surface 1204. During playback of modified media content 1308, ad object 1306 can be displayed in modified frames 1302B(1)-(4) without interrupting the flow of modified media content 1308. Accordingly, viewer experience can be improved and advertisement time and space for target objects can be increased. In some embodiments, the location of homogeneous surface 1204 may change slightly from frame 1302A(1) to frame 1302A(4), content modification system 546 can adjust inserted ad object 1306 based on different locations of homogeneous surface 1204.

In some embodiments, quality control system 556 can review the processed content, remove artifacts in processed content, and improve the image quality of inserted target objects. For example, as shown in FIG. 13, scene 1360 may include a number of frames that include a series of motions. During these motions, homogeneous surface 1204 may change locations and/or vary in size from frames 1302A(1) to frames 1320A(4). Accordingly, in some embodiments, ad object 1306 may need to be enlarged or shrunk to fit within homogeneous surface 1204 as it changes locations and/or varies in size in frames 1302A(1)-(4). The resizing of ad object 1306 may introduce artifacts in frames 1302A(1)-(4). Quality control system 556 can review the processed content and reduce artifacts introduced after the content modification. In some embodiments, objects inserted to frames of high motion video content may introduce additional artifacts. Quality control system 556 can remove the inserted target objects from frames of high motion video content.

Figure 14:
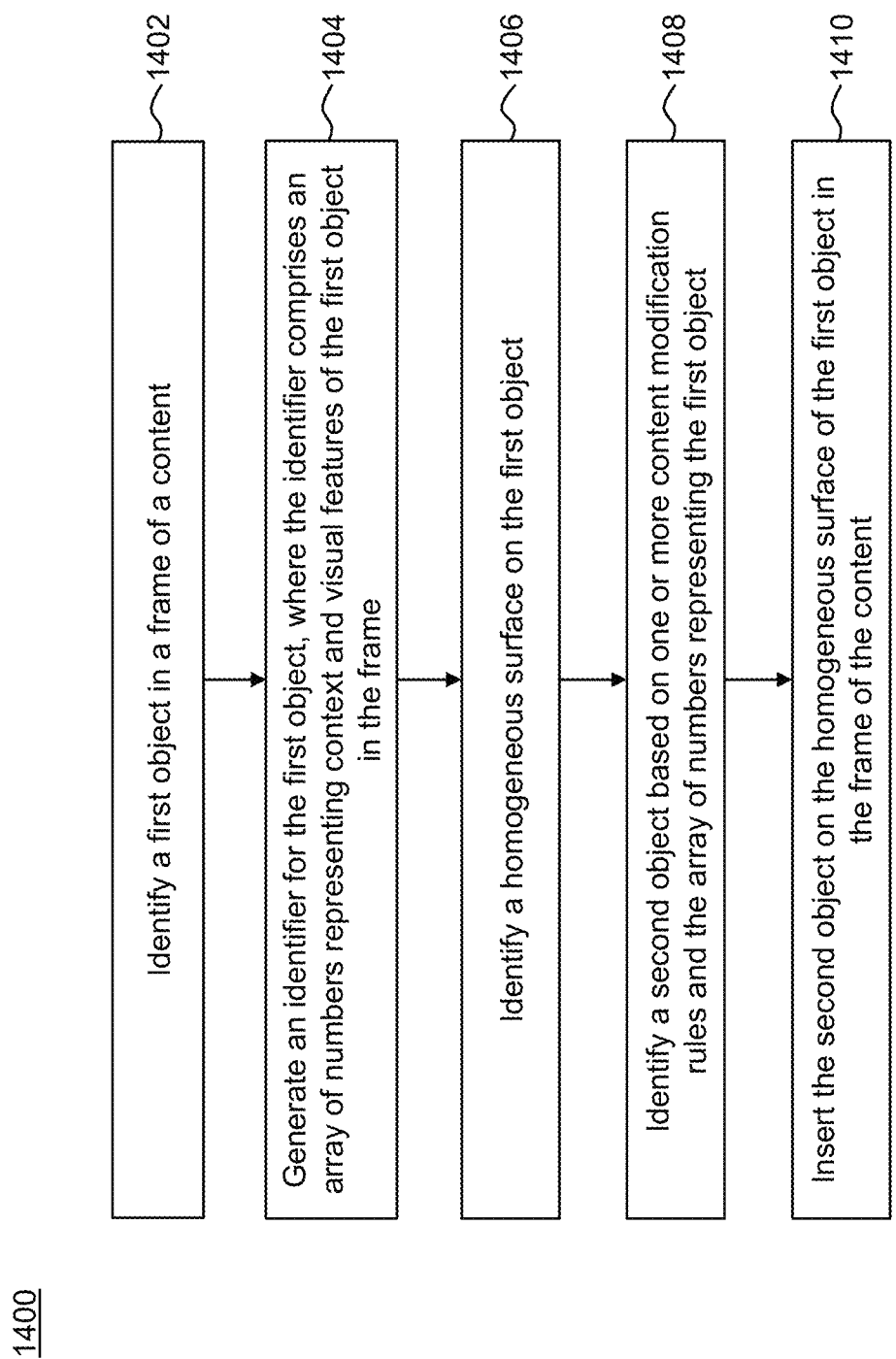
FIG. 14 is a flowchart illustrating a method for inserting an object to a frame of a content during playback of the content, according to some embodiments.

FIG. 14 is a flowchart illustrating a method 1400 for inserting an object to a frame of a content during playback of the content, according to some embodiments. Method 1400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 14, as will be understood by a person of ordinary skill in the art. Method 1400 shall be described with reference to FIGS. 5-9, 12, and 13. However, method 1400 is not limited to that example embodiment.

Referring to FIG. 14, in step 1402, a first object is identified in a frame of a content. For example, as shown in FIG. 6, mirror 602A, lamp 604A, pillow 606A, large sofa 608A, table 610A, small sofa 612A, and other objects in original image 600A can be segmented and identified by object identification system 548. The identified mirror 602B, lamp 604B, pillow 606B, large sofa 608B, table 610B, small sofa 612B, and other objects can be demonstrated in segmented image 600B. In another example shown in FIG. 10, object identification system 548 can identify objects 1002(1)-(4). Additionally, object identification system 548 can identify object 1102 (e.g., an outfit) in frame 1100 in FIG. 11 and object 1202 (e.g., a mailbox) in frame 1200 in FIG. 12. In some embodiments, object identification system 548 can use a machine learning model to segment objects in an image and to recognize the objects in the image. In some embodiments, the machine learning model can be trained with semantic and context information of the objects in the image. In some embodiments, the machine learning model can be trained with the images modified by replacing the objects with different variants.

In step 1404, an identifier for the first object can be generated. The identifier can include an array of numbers representing context and visual features of the first object in the frame, such as the object location of the first object in the frame. For example, as shown in FIG. 7, identifiers 706(1)-(N) can be generated for images 702(1)-(N). Each of identifiers 706(1)-(N) can include an array of numbers representing context and visual features, such as the object location, of the object in images 702(1)-(N). In another example shown in FIG. 9, identifiers 906 can be generated for each frame of media content 900. Identifiers 906 can include arrays of numbers representing context and visual features of the objects in the frames of media content 900. In some embodiments, as shown in FIG. 5, image encoder 554 can generate identifiers 706(1)-(N) for images 702(1)-(N) and identifiers 906 for the frames of media content 900. In some embodiments, the array of numbers can be generated by a machine learning model to identify objects and compare objects.

In step 1406, a homogeneous surface of the first object can be identified. For example, as shown in FIG. 12, homogeneous surface 12 can be identified by object identification system 548. In some embodiments, homogeneous surface 1204 can have any shape, such as a square, a rectangle, a circle, an oval, and a triangle. In some embodiments, homogeneous surface 1204 may not have any text or images.

In step 1408, a second object can be identified based on one or more content modification rules and the array of numbers representing the first object. For example, as shown in FIG. 13, ad object 1306 can be identified based on the array of numbers representing identified object 1202 (e.g., a mailbox). The array of numbers can represent context and visual features of identified object 1202 in frames 1302A(1)-(4), such as homogeneous surface 1204 on a mailbox object 1202. In some embodiments, object identification system 548 can identify ad object 1306 based on the context and visual features of identified object 1202. Additionally, object identification system 548 may identify ad object 1306 based on one or more content modification rules 438. Content modification rules 438 may include a list of appropriate object categories to insert onto the homogeneous surfaces of identified objects. In some embodiments, the characteristics of the homogeneous surface 1204 may be considered when identifying and selecting a target object to be inserted into the one or more frames.

In step 1410, the second object is inserted on the homogeneous surface of the first object in the frame of the content. For example, as shown in FIG. 13, ad object 1306 can be inserted on homogeneous surface 1204 in frames 1302B(1)-(4). In some embodiments, content modification system 546 can perform further operations on ad object 1306 to fit in homogeneous surface 1204, such as resizing and rotation.

Figure 15:
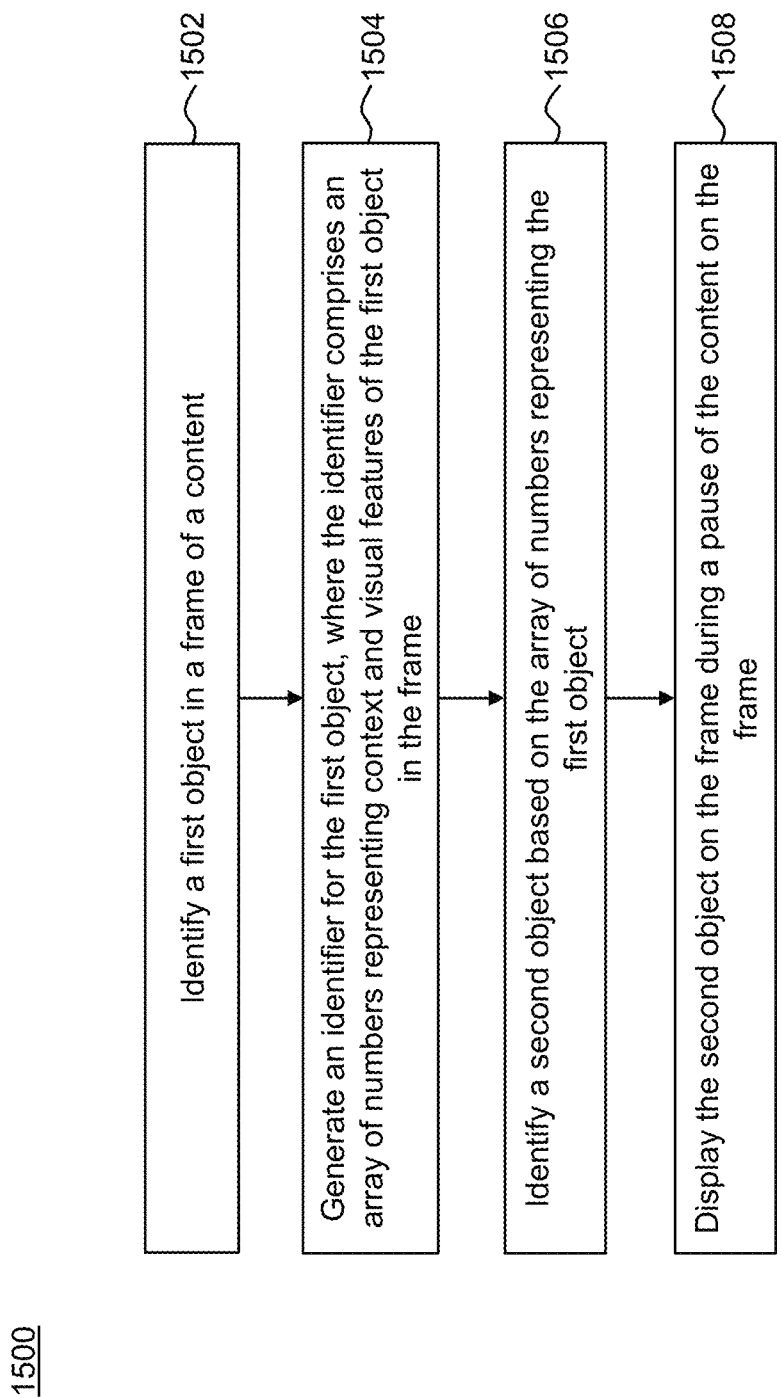
FIG. 15 is a flowchart illustrating a method for displaying a target object based on an identified object in a frame of a content during a pause of the content on the frame, according to some embodiments.

FIG. 15 is a flowchart illustrating a method 1500 for displaying a target object based on an identified object in a frame of a content during a pause of the content on the frame, according to some embodiments. Method 1500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 15, as will be understood by a person of ordinary skill in the art. Method 1500 shall be described with reference to FIGS. 5-11. However, method 1500 is not limited to that example embodiment.

Referring to FIG. 15, in step 1502, a first object is identified in a frame of a content. In some embodiments, step 1502 can be similar to step 1402. For example, as shown in FIG. 6, mirror 602A, lamp 604A, pillow 606A, large sofa 608A, table 610A, small sofa 612A, and other objects in original image 600A can be segmented and identified by object identification system 548. The identified mirror 602B, lamp 604B, pillow 606B, large sofa 608B, table 610B, small sofa 612B, and other objects can be demonstrated in segmented image 600B. In another example shown in FIG. 10, object identification system 548 can identify objects 1002(1)-(4) in original images 1000(1) and 1000(2). In some embodiments, object identification system 548 can use a machine learning model to segment objects in an image and to recognize the objects in the image. In some embodiments, the machine learning model can be trained with semantic and context information of the objects in the image. In some embodiments, the machine learning model can be trained with the image modified by replacing the objects with different variants.

In step 1504, an identifier for the first object can be generated. The identifier can include an array of numbers representing context and visual features of the first object in the frame. In some embodiments, step 1504 can be similar to step 1404. For example, as shown in FIG. 7, identifiers 706(1)-(N) can be generated for images 702(1)-(N). Each of identifiers 706(1)-(N) can include an array of numbers representing context and visual features of the object in images 702(1)-(N). In another example shown in FIG. 9, identifiers 906 can be generated for each frame of media content 900. Identifiers 906 can include arrays of numbers representing context and visual features of the objects in the frames of media content 900. In some embodiments, as shown in FIG. 5, image encoder 554 can generate identifiers 706(1)-(N) for images 702(1)-(N) and identifiers 906 for the frames of media content 900. In some embodiments, the array of numbers can be generated by a machine learning model to identify objects and compare objects.

In step 1506, a second object is identified based on the array of numbers representing the first object. For example, as shown in FIG. 10, based on the arrays of numbers for identified objects 1002(1)-(4), object identification system 548 can identify target objects 1012A, 1012B, 1012C similar to identified object 1002(1), target object 1014 similar to identified object 1002(3), target object 1016 similar to identified object 1002(2), and target object 1018 similar to identified object 1002(4). In some embodiments, similarities between target objects and identified objects may be based on one or more of the categories of the target and identified objects. In another example shown in FIG. 11, based on the arrays of numbers for identified object 1102 (e.g., an outfit) on frame 1100, object identification system 548 can identify target objects 1112A-C (e.g., similar outfits) similar to identified object 1102. In some embodiments, object identification system 548 can identify similar objects using a machine learning model. In some embodiments, the machine learning model can compare the identifiers of the identified objects and the target objects to find target objects in object storage 544 similar to the identified objects. In some embodiments, the comparison process can include determining a distance between the arrays of numbers for the identified objects and the target objects. In some embodiments, the target object may be further identified based on the characteristics of the surface (e.g., dimensions, shape) in the frame onto which the target object will be displayed.

In step 1508, the second object is selected and displayed in the frame during a pause of the content on the frame. For example, as shown in FIG. 11, when the media content is paused on frame 1100, the identified similar target objects 1112A-C (e.g., similar outfits) can be displayed on display device 108. As target objects 1112A-C are presented on display device 108 during a pause of the media content, target objects 1112A-C may not interrupt the flow of the media content and the viewer's experience can be improved. Additionally, as shown in FIG. 11, price tags 1116A-C and checkout links 1118A-C can be displayed together with corresponding target objects 1112A-C, which can provide convenience for the viewer to buy target objects 1112A-C and promote the sales of target objects 1112A-C. After play button 1122 is clicked, playback of the media content can continue on display device 108 and target objects 1112A-C may not be displayed during the playback.

Example Computer System

Figure 16:
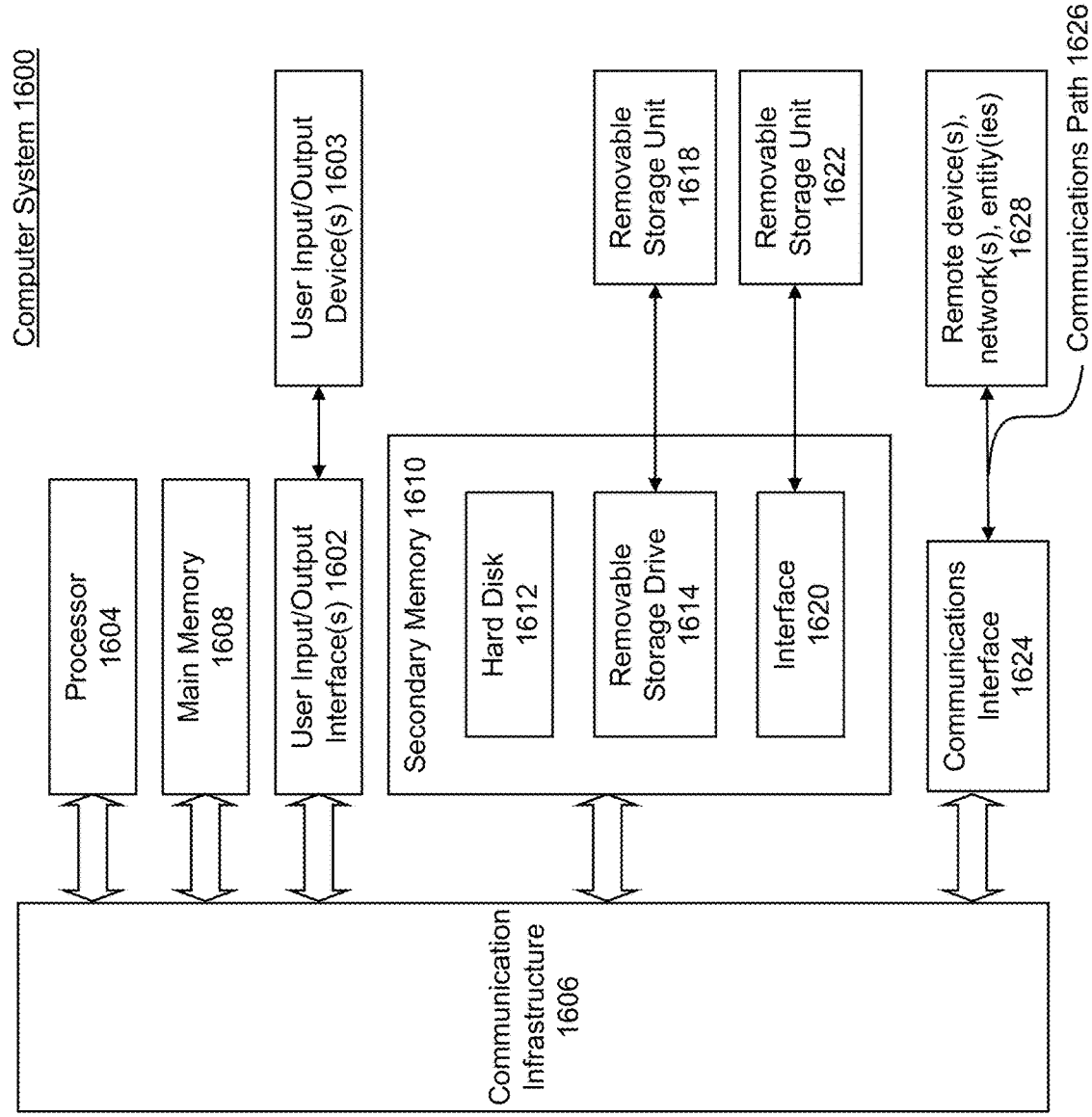
FIG. 16 illustrates an example computer system useful for implementing various embodiments.

Various embodiments may be implemented, for example, using one or more well-known computer systems, such as computer system 1600 shown in FIG. 16. For example, the media device 106 may be implemented using combinations or sub-combinations of computer system 1600. Also or alternatively, one or more computer systems 1600 may be used, for example, to implement any of the embodiments discussed herein, as well as combinations and sub-combinations thereof.

Computer system 1600 may include one or more processors (also called central processing units, or CPUs), such as a processor 1604. Processor 1604 may be connected to a communication infrastructure or bus 1606.

Computer system 1600 may also include user input/output device(s) 1603, such as monitors, keyboards, pointing devices, etc., which may communicate with communication infrastructure 1606 through user input/output interface(s) 1602.

One or more of processors 1604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1600 may also include a main or primary memory 1608, such as random access memory (RAM). Main memory 1608 may include one or more levels of cache. Main memory 1608 may have stored therein control logic (i.e., computer software) and/or data.

Computer system 1600 may also include one or more secondary storage devices or memory 1610. Secondary memory 1610 may include, for example, a hard disk drive 1612 and/or a removable storage device or drive 1614. Removable storage drive 1614 may be a floppy disk drive, a magnetic tape drive, a compact disk drive, an optical storage device, tape backup device, and/or any other storage device/drive.

Removable storage drive 1614 may interact with a removable storage unit 1618. Removable storage unit 1618 may include a computer usable or readable storage device having stored thereon computer software (control logic) and/or data. Removable storage unit 1618 may be a floppy disk, magnetic tape, compact disk, DVD, optical storage disk, and/any other computer data storage device. Removable storage drive 1614 may read from and/or write to removable storage unit 1618.

Secondary memory 1610 may include other means, devices, components, instrumentalities or other approaches for allowing computer programs and/or other instructions and/or data to be accessed by computer system 1600. Such means, devices, components, instrumentalities or other approaches may include, for example, a removable storage unit 1622 and an interface 1620. Examples of the removable storage unit 1622 and the interface 1620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1600 may further include a communication or network interface 1624. Communication interface 1624 may enable computer system 1600 to communicate and interact with any combination of external devices, external networks, external entities, etc. (individually and collectively referenced by reference number 1628). For example, communication interface 1624 may allow computer system 1600 to communicate with external or remote devices 1628 over communications path 1626, which may be wired and/or wireless (or a combination thereof), and which may include any combination of LANs, WANs, the Internet, etc. Control logic and/or data may be transmitted to and from computer system 1600 via communication path 1626.

Computer system 1600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1600, main memory 1608, secondary memory 1610, and removable storage units 1618 and 1622, as well as tangible articles of manufacture embodying any combination of the foregoing. Such control logic, when executed by one or more data processing devices (such as computer system 1600 or processor(s) 1604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 16. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system, comprising:
   a storage module; and
   at least one processor each coupled to the storage module and configured to:
   identify a first object in a frame of a content;
   generate an identifier for the first object in the frame, wherein the identifier comprises an array of numbers representing context and visual features of the first object in the frame;
   identify a second object based on the array of numbers representing the first object; and
   insert the second object into the frame of the content.

2. The system of claim 1, wherein inserting the second object into the frame comprises displaying the second object during a pause of the content on the frame.

3. The system of claim 1, wherein the at least one processor is further configured to identify a homogeneous surface on the first object and display the second object on the homogeneous surface during playback of the content.

4. The system of claim 1, wherein inserting the second object into the frame comprises modifying the frame of the content according to a content modification rule.

5. The system of claim 1, wherein the at least one processor is further configured to identify the second object according to a user preference.

6. The system of claim 1, wherein the at least one processor is further configured to generate an additional identifier for the second object, wherein the additional identifier comprises an additional array of numbers representing the second object.

7. The system of claim 3, wherein inserting the second object into the frame comprises inserting the second object on the homogeneous surface of the first object.

8. The system of claim 3, wherein the at least one processor is further configured to resize the second object to fit the homogenous surface.

9. The system of claim 6, wherein identifying the second object comprises determining a distance between the array of numbers and the additional array of numbers.

10. A computer-implemented method, comprising:
identifying a first object in a frame of a content;
generating an identifier for the first object in the frame, wherein the identifier comprises an array of numbers representing context and visual features of the first object in the frame;
identifying a second object based on the array of numbers representing the first object; and
inserting the second object into the frame of the content.

11. The computer-implemented method of claim 10, wherein inserting the second object into the frame comprises displaying the second object during a pause of the content on the frame.

12. The computer-implemented method of claim 10, further comprising identifying a homogeneous surface on the first object and displaying the second object on the homogeneous surface during playback of the content.

13. The computer-implemented method of claim 10, further comprising generating an additional identifier for the second object, wherein the additional identifier comprises an additional array of numbers representing the second object.

14. The computer-implemented method of claim 12, wherein inserting the second object into the frame comprises inserting the second object on the homogeneous surface of the first object.

15. The computer-implemented method of claim 12, further comprising resizing the second object to fit the homogenous surface.

16. The computer-implemented method of claim 13, wherein identifying the second object comprises determining a distance between the array of numbers and the additional array of numbers.

17. A non-transitory computer-readable medium having instructions stored thereon that, when executed by at least one computing device, cause the at least one computing device to perform operations comprising:
identifying a first object in a frame of a content;
generating an identifier for the first object in the frame, wherein the identifier comprises an array of numbers representing context and visual features of the first object in the frame;
identifying a second object based on the array of numbers representing the first object; and
inserting the second object into the frame of the content.

18. The non-transitory computer-readable medium of claim 17, wherein inserting the second object into the frame comprises displaying the second object during a pause of the content on the frame.

19. The non-transitory computer-readable medium of claim 17, wherein the at least one computing device performs operations further comprising identifying a homogeneous surface on the second object and displaying the second object on the homogeneous surface during playback of the content.

20. The non-transitory computer-readable medium of claim 19, wherein inserting the second object into the frame comprises inserting the second object on the homogeneous surface of the first object.

* * * * *